United States Patent
Kowaki

(10) Patent No.: US 9,302,720 B2
(45) Date of Patent: Apr. 5, 2016

(54) VEHICLE BODY FLOOR PANEL STRUCTURE AND METHOD FOR DESIGNING SAME

(71) Applicant: MAZDA MOTOR CORPORATION, Hiroshima (JP)

(72) Inventor: Miho Kowaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/345,635

(22) PCT Filed: Oct. 4, 2012

(86) PCT No.: PCT/JP2012/006388
§ 371 (c)(1),
(2) Date: Mar. 18, 2014

(87) PCT Pub. No.: WO2013/057892
PCT Pub. Date: Apr. 25, 2013

(65) Prior Publication Data
US 2015/0042128 A1    Feb. 12, 2015

(30) Foreign Application Priority Data
Oct. 21, 2011   (JP) .................. 2011-231814

(51) Int. Cl.
*B62D 43/10* (2006.01)
*B62D 25/20* (2006.01)
*G01M 7/02* (2006.01)

(52) U.S. Cl.
CPC ............... *B62D 43/10* (2013.01); *B62D 25/20* (2013.01); *B62D 25/2027* (2013.01); *G01M 7/02* (2013.01)

(58) Field of Classification Search
CPC .. B62D 25/087; B62D 25/20; B62D 25/2027; B62D 43/10; B62D 21/152; G01M 7/02; B60R 5/04
See application file for complete search history.

(56) References Cited

U.S. PATENT DOCUMENTS 5,501,289 A     3/1996  Nishikawa et al.
5,586,698 A  * 12/1996  Satoh .................. 224/42.24

(Continued)

FOREIGN PATENT DOCUMENTS

CN       1608926 A       4/2005
DE       3035644 A1  *   5/1982    ............. B62D 29/04

(Continued)

OTHER PUBLICATIONS

An Office Action; "Notice of Reasons for Rejection," issued by the Japanese Patent Office on May 12, 2015, which corresponds to Japanese Patent Application No. 2011-231814 and is related to U.S. Appl. No. 14/345,635; with English language summary.

(Continued)

*Primary Examiner* — Glenn Dayoan
*Assistant Examiner* — Paul Chenevert
(74) *Attorney, Agent, or Firm* — Studebaker & Brackett PC

(57) ABSTRACT

A floor panel includes: an article storage portion formed to protrude downwardly at a position spaced apart from each of two frame members on vehicle widthwise opposite sides thereof; and a pair of right and left lateral coupling portions each provided between a respective one of the frame members and the article storage portion. A storage bottom of the article storage portion has an upwardly or downwardly convex curved surface, and a storage wall of the article storage portion is configured such that each of right and left upper ends thereof is located below a corresponding one of two joint sections between respective ones of the lateral coupling portions of the floor panel and respective ones of the frame members. At least one of the pair of lateral coupling portions is formed by a downwardly inclined planar or curved surface.

11 Claims, 10 Drawing Sheets

(56) References Cited

U.S. PATENT DOCUMENTS

| | | | |
|---|---|---|---|
| 5,799,845 A * | 9/1998 | Matsushita | 224/42.14 |
| 6,830,287 B1 * | 12/2004 | Aghssa et al. | 296/187.11 |
| 2003/0102687 A1 * | 6/2003 | McLeod et al. | 296/37.2 |
| 2004/0262934 A1 | 12/2004 | Harima et al. | |
| 2004/0262935 A1 * | 12/2004 | Harima et al. | 296/37.3 |
| 2005/0082879 A1 | 4/2005 | Goto et al. | |
| 2006/0091688 A1 * | 5/2006 | McGuckin et al. | 296/37.2 |
| 2008/0277968 A1 | 11/2008 | Egawa et al. | |
| 2010/0225135 A1 * | 9/2010 | Taneda | 296/37.2 |
| 2011/0001337 A1 * | 1/2011 | Patschicke | B62D 25/087 296/193.07 |
| 2011/0155772 A1 * | 6/2011 | Souma et al. | 224/42.12 |
| 2011/0260503 A1 * | 10/2011 | Fujii et al. | 296/205 |
| 2015/0084376 A1 * | 3/2015 | Shigihara | 296/193.07 |

FOREIGN PATENT DOCUMENTS

| | | | | |
|---|---|---|---|---|
| FR | 2657836 A1 * | 8/1991 | | B62D 43/10 |
| GB | 2321037 A * | 7/1998 | | B60R 11/06 |
| JP | 07-315256 A | 12/1995 | | |
| JP | 2000-255455 A | 9/2000 | | |
| JP | 2002-337749 A | 11/2002 | | |
| JP | 2002-362428 A | 12/2002 | | |
| JP | 2004-322830 A | 11/2004 | | |
| JP | 2006-035893 A | 2/2006 | | |
| JP | 2008-279798 A | 11/2008 | | |
| JP | 2010-013055 A | 1/2010 | | |
| JP | 2010-221877 A | 10/2010 | | |
| WO | WO 2014027151 A1 * | 2/2014 | | B62D 43/10 |

OTHER PUBLICATIONS

International Search Report; PCT/JP2012/006388; Dec. 25, 2012.
The First Office Action issued by the Chinese Patent Office on Sep. 1, 2015, which corresponds to Chinese Patent Application No. 201280044373.8 and is related to U.S. Appl. No. 14/345,635; with English language summary.

* cited by examiner

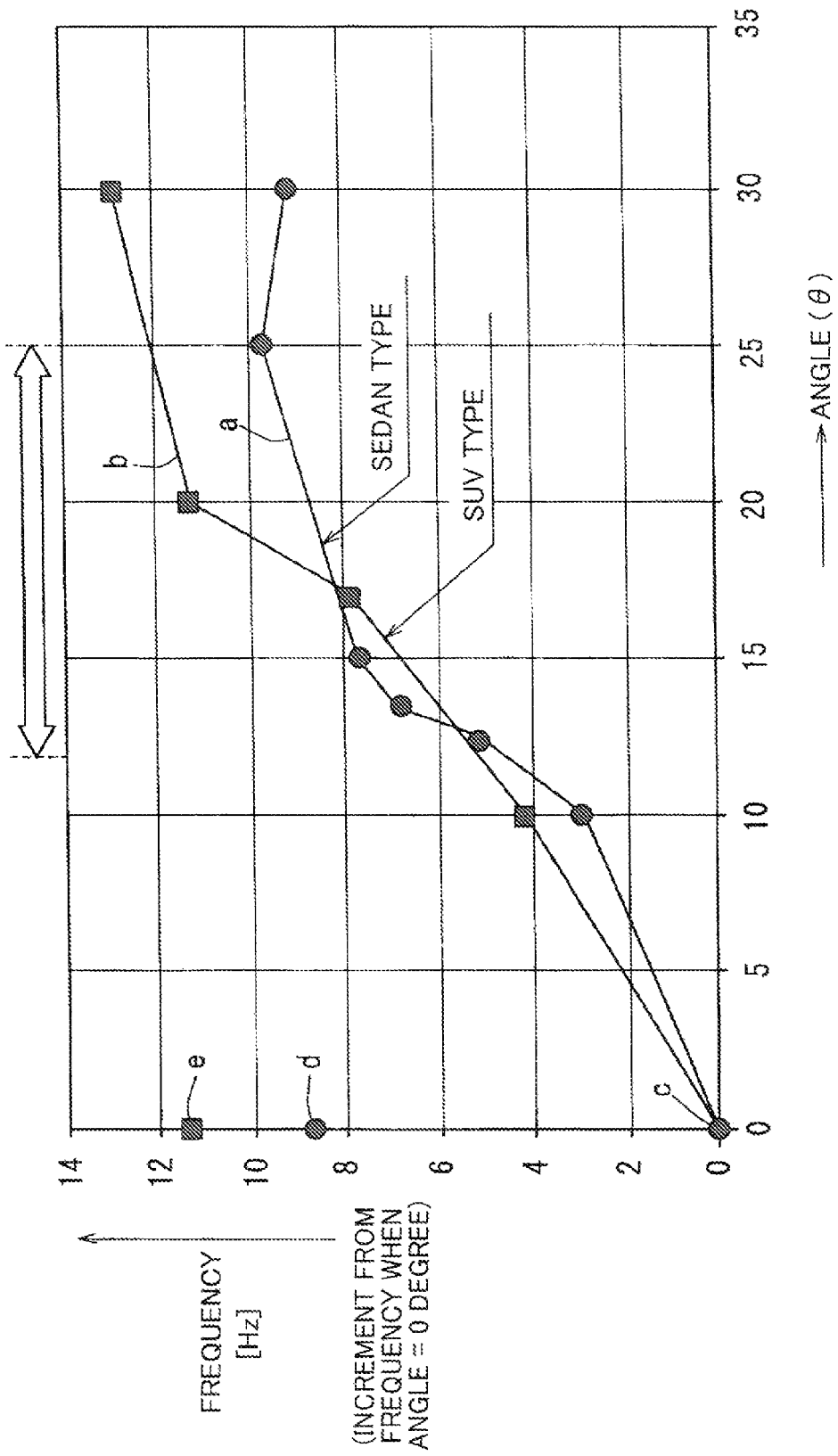

VEHICLE BODY FLOOR PANEL STRUCTURE AND METHOD FOR DESIGNING SAME

TECHNICAL FIELD

The present invention relates to a vehicle body floor panel structure which comprises a floor panel, and a plurality of frame members arranged on vehicle forward and rearward sides of and vehicle widthwise opposite sides of the floor panel to surround an outer peripheral edge of the floor panel and each joined to the floor panel through a respective one of a plurality of joint sections, and a design method for the vehicle body floor panel structure.

BACKGROUND ART

Heretofore, there has been a problem that, due to vibration of an article, such as a spare tire, during running of a vehicle, an article storage portion, such as a spare tire pan, supporting and fixing the article, is vibrated (primarily, vibrated in an up-down direction) to enter into resonance together with a surrounding region, thereby generating noise, such as muffled sound within a passenger compartment (ear-oppressing sound of a bandwidth from 20 to 300 Hz), and giving a passenger a discomfort feeling.

In order to solve this problem, vehicle body floor panel structures disclosed in the following Japanese references JP 2010-221877A and JP 2000-255455A have already been proposed.

In the structure disclosed in the JP 2010-221877A, in order to allow an article such as a tire to be spaced apart from a floor panel forming an article storage portion (tire hosing), an article holding portion such as a rear floor cross member is disposed to extend between right and left rear side frames each located on a respective one of opposite sides of and above the article storage portion, and used to allow an article such as a tire to be pulled upwardly away from the floor panel, thereby shifting a resonant frequency of the floor panel out of a low frequency band during vehicle running, to reduce noise due to vibration of the article storage portion.

However, the conventional structure disclosed in the JP 2010-221877A additionally requires the article holding portion such as a rear floor cross member, so that a vehicle body weight is increased. This has an advantage of being able to achieve a reduction in noise, on the other hand, has a problem that a reduction in vehicle body weight is hindered.

In the structure disclosed in the JP 2000-255455A, a rear cross member and a reinforcing rib are provided underneath a rear floor panel comprising an article storage portion (tire well), to enhance rigidity of the article storage portion, thereby preventing occurrence of vibration and abnormal noise to improve ride quality of the vehicle.

However, the conventional structure disclosed in the JP 2000-255455A also has a problem of an increase in vehicle body weight, due to a need for an additional member such as the rear cross member and the reinforcing rib.

SUMMARY OF THE INVENTION

It is therefore an object of the present invention to provide a vehicle body floor panel structure capable of enhancing rigidity of an article storage portion without a need for an additional member such as a cross member to control a resonant frequency (primary resonant frequency of the article storage portion), thereby achieving an improvement in NVH performance while maintaining a balance between a reduction in vehicle body weight and the resonant frequency control.

It is another object of the present invention to a vehicle body floor panel structure design method capable of controlling the resonant frequency simply and in a versatile manner without a need for a change of a vehicle body structure.

The term "NVH" here means an abbreviation of Noise, Vibration, and Harshness (coupled vibration).

The present invention for achieving the above object relates to a vehicle body floor panel structure which comprises a floor panel, and a plurality of frame members arranged on vehicle forward and rearward sides of and vehicle widthwise opposite sides of the floor panel to surround an outer peripheral edge of the floor panel and each joined to the floor panel through a respective one of a plurality of joint sections. The floor panel comprises: an article storage portion formed to protrude downwardly at a position spaced apart from each of at least two of the plurality of frame members on the vehicle widthwise opposite sides of the floor panel; and a pair of right and left lateral coupling portions each provided between a respective one of the two frame members on the vehicle widthwise opposite sides of the floor panel and the article storage portion. The article storage portion has a storage bottom forming a bottom region of the article storage portion, and a storage wall forming a peripheral wall region of the article storage portion. The storage bottom has an upwardly or downwardly convex curved surface. The storage wall is configured such that each of right and left upper ends thereof is located below a corresponding one of the joint sections between the floor panel and respective ones of the two frame members on the vehicle widthwise opposite sides of the floor panel. Each of the pair of lateral coupling portions is provided to couple each of the right and left upper ends of the storage wall and a corresponding one of the joint sections together. At least one of the pair of lateral coupling portions is formed by a downwardly inclined planar or curved surface.

The present invention also relates to a method for designing the above vehicle body floor panel structure. The design method comprises: a first step of specifying a vibration system which can cause resonance with the vehicle body floor panel; a second step of specifying a resonant frequency and a magnitude of a vibration input of the vibration system by means of simulation analysis; and a third step of setting an angle defined between a line tangent to a surface of a vehicle widthwise cross-section of each of the lateral coupling portions and a horizontal line passing through a corresponding one of the joint sections, to a value capable of providing a resonant frequency which is less subject to influence of the vibration system.

The present invention has an advantageous effect of being able to enhance rigidity of the article storage portion without a need for an additional member such as a cross member to control a resonant frequency (primary resonant frequency of the article storage portion), thereby achieving an improvement in NVH performance while maintaining a balance between a reduction in vehicle body weight and the resonant frequency control.

BRIEF DESCRIPTION OF THE DRAWINGS

FIG. 6 is a graph representing frequency vs. angle characteristics.

DESCRIPTION OF EMBODIMENTS

One embodiment of the present invention will now be described in detail, based on the drawings.

The drawings illustrate a vehicle body floor panel structure and a design method therefor. First of all, with reference to FIG. 1, a vehicle body structure will be schematically described. In the figures, the arrowed line F indicates a forward direction of a vehicle.

Figure 1:
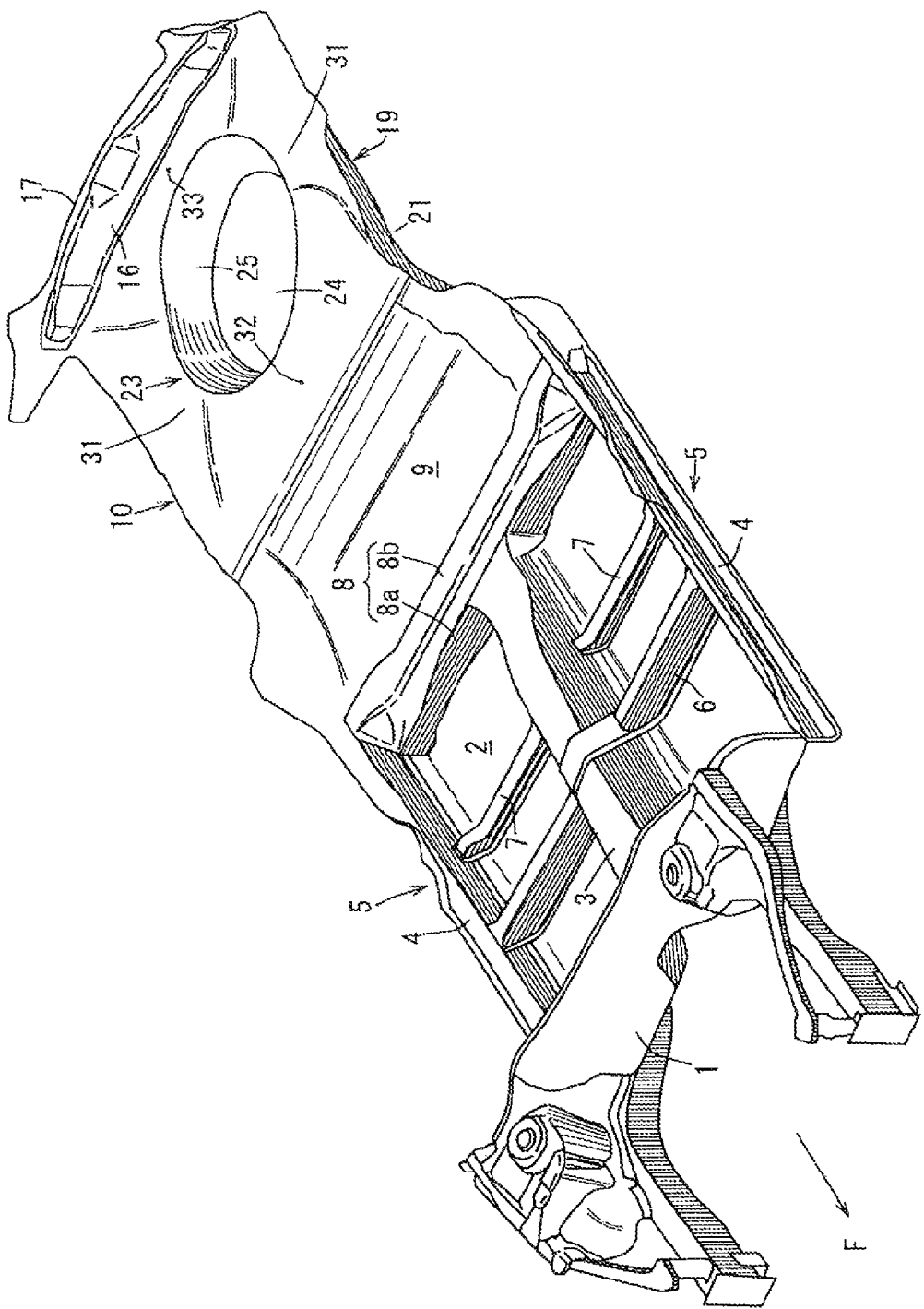
FIG. 1 is a perspective view illustrating a vehicle body floor panel structure.

FIG. 1 is a perspective view in a state in which a rear side frame upper panel, and a rear cross member upper panel (upper panel of a so-called "No. 4 cross member") are omitted. In FIG. 1, a front of a vehicle body is provided with a dash lower panel 1 separating an engine compartment from a passenger compartment in a forward-rearward direction of the vehicle, and a floor panel 2 is coupled and fixed to a rear edge of a lower portion of the dash lower panel 1 to extend approximately horizontally toward a rearward direction of the vehicle.

A tunnel section 3 is integrally or substantially integrally formed with the floor panel 2 in a vehicle widthwise central region thereof, in such a manner as to extend in the forward-rearward direction of the vehicle while protruding inside the passenger compartment.

A side sill 5 comprising a side sill inner panel 4 and a side sill outer panel is joined and fixed to each of right and left edges of the floor panel 2. The side sill 5 is a vehicle body rigidity member which comprises the side sill inner panel 4 and the side sill outer panel (illustration is omitted) butted against and joined to the side sill inner panel 4, wherein the side sill inner panel 4 and the side sill outer panel form therebetween a side-sill closed cross-section extending in the forward-rearward direction of the vehicle.

The floor panel 2 is also provided with a floor cross member 6 (so-called "No. 2 cross member") coupling between the right and left side sill inner panels 4, 4 in the vehicle width direction while striding over the tunnel section 3. The floor cross member 6 forms a closed cross-section extending in the vehicle width direction, in cooperation with the floor panel 2, and therefore fulfills a role in enhancing rigidity of a lower portion of the vehicle body.

A pair of right and left floor cross members 7, 7 are provided at positions spaced apart in the rearward direction of the vehicle with respect to the floor cross member 6, to couple opposite vertical walls of the tunnel section 3 to respective ones of the right and left side sill inner panels 4, 4 in the vehicle width direction. The floor cross member 7 forms a closed cross-section extending in the vehicle width direction, in cooperation with the floor panel 2, and therefore fulfills a role in enhancing rigidity of the lower portion of the vehicle body.

In this embodiment, the front floor cross member 6 and the rear floor cross member 7 are arranged parallel to each other.

A kick-up section 8 is coupled to a rear edge of the floor panel 2. The kick-up section 8 comprises a vertical wall 8a extending in an upward-downward direction, and a horizontal wall 8b extending from an upper edge of the vertical wall 8a approximately horizontally in the rearward direction of the vehicle. The kick-up section 8 is formed to extend in the vehicle width direction as a whole.

The tunnel section 3 is formed to extend over and between the dash lower panel 1 and the kick-up section 8, in the forward-rearward direction of the vehicle.

Further, a rear floor panel 10 (hereinafter abbreviated simply as "rear floor") is coupled and fixed to a rear portion of the kick-up section 8 through a rear seat pan 9.

Figure 2:
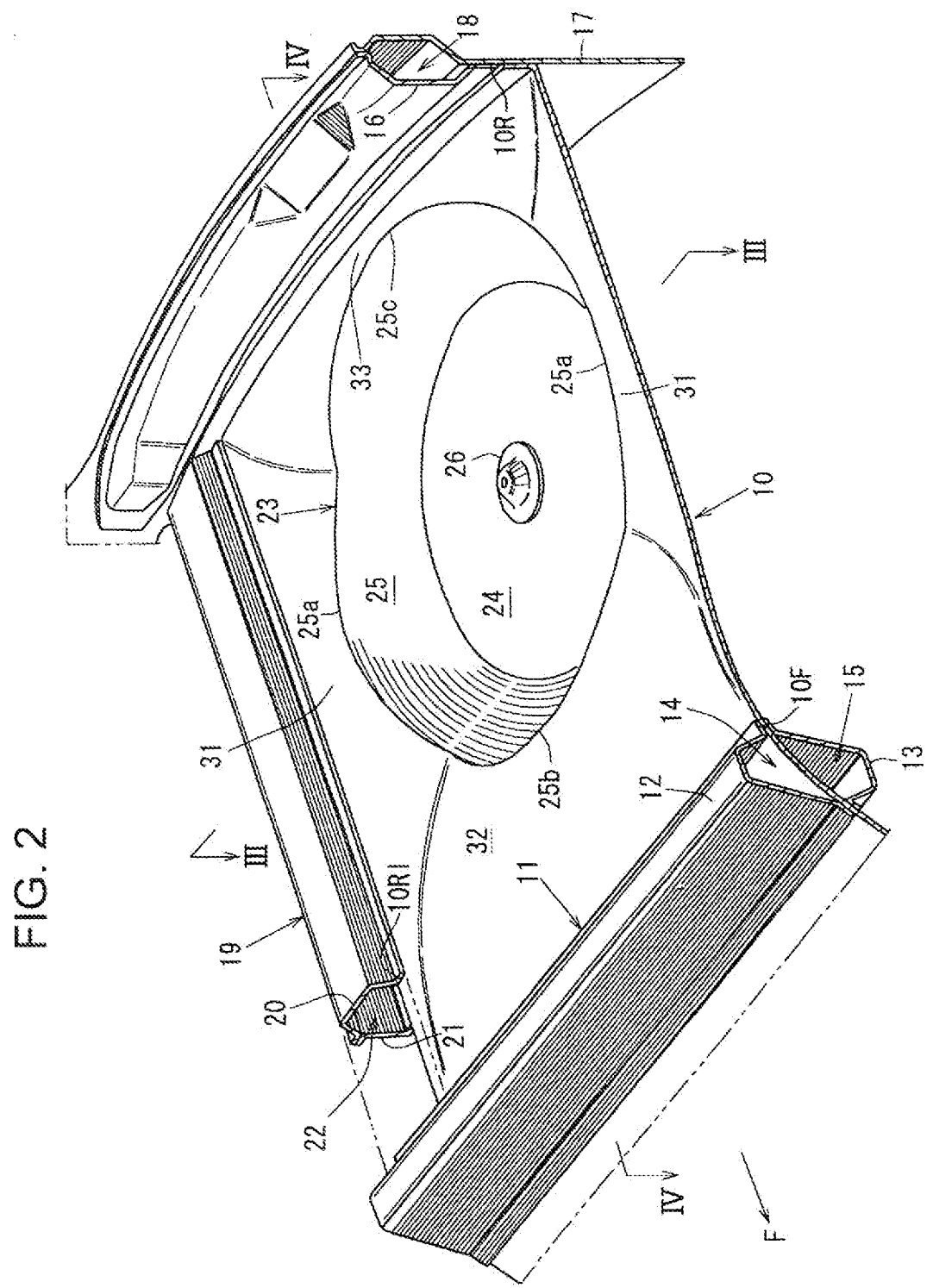
FIG. 2 is an enlarged perspective view of a substantial part in FIG. 1.
Figure 3:
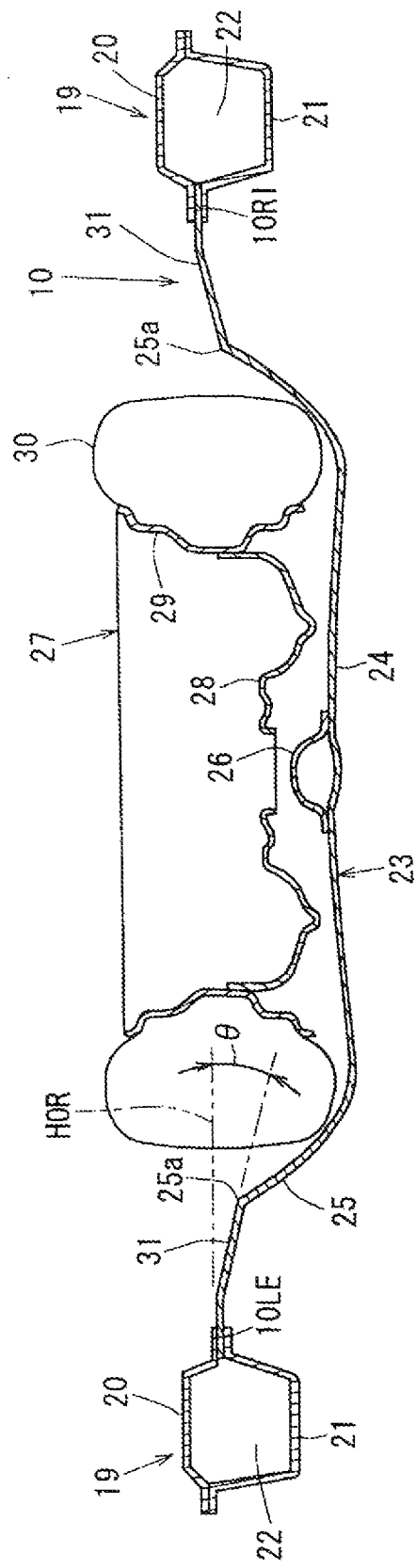
FIG. 3 is a sectional view taken along the arrowed line III-III in FIG. 2.

FIG. 2 is an enlarged perspective view of a substantial part in FIG. 1, illustrating the vehicle body floor panel structure. FIG. 3 is a sectional view taken along the vehicle width direction, more specifically, the arrowed line III-III in FIG. 2, and FIG. 4 is a sectional view taken along the forward-rearward direction of the vehicle, more specifically, the arrowed line IV-IV in FIG. 2.

Figure 4:
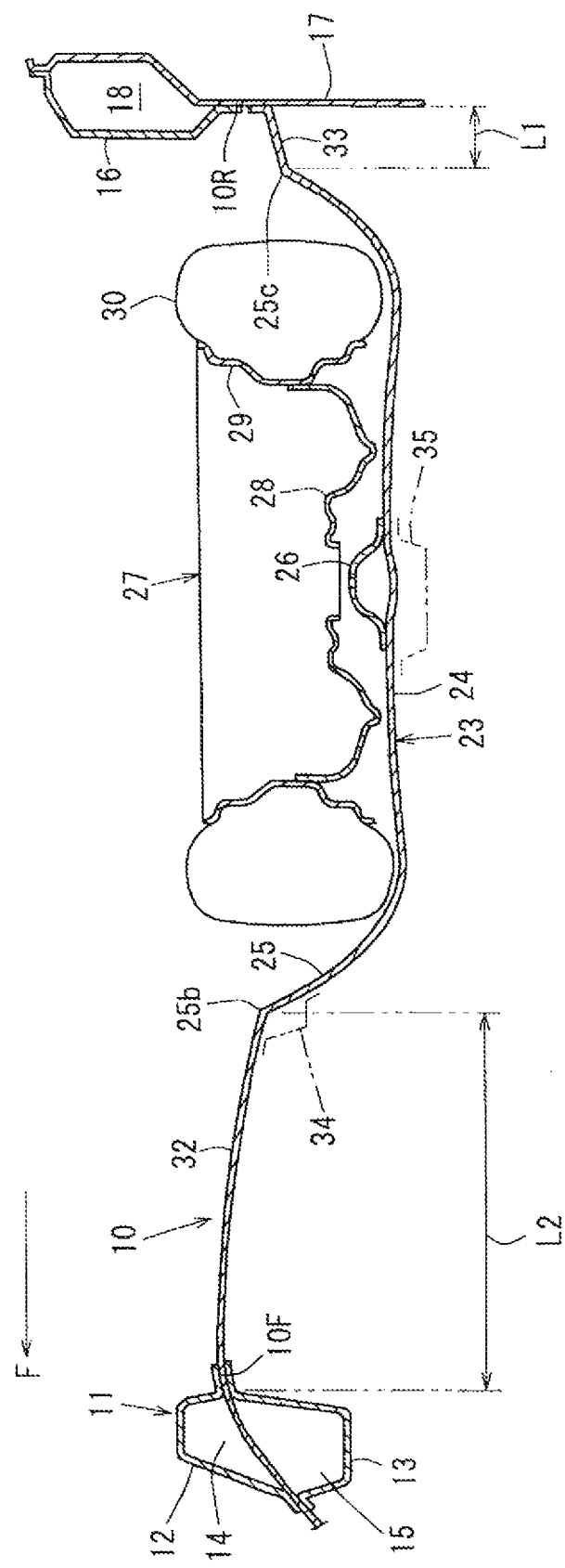
FIG. 4 is a sectional view taken along the arrowed line IV-IV in FIG. 2.

As illustrated in FIGS. 2 and 4, a rear cross member 11 (so-called "No. 4 cross member") is joined and fixed to a vehicle forward side of the rear floor 10 through a joint section 10F.

The rear cross member 11 is a vehicle body strength member which extends in the vehicle width direction, and comprises a cross-sectionally hat-shaped rear cross member upper panel 12, and a cross-sectionally inverted hat-shaped rear cross member lower panel 13. The rear floor 10 and the rear cross member upper panel 12 form therebetween a rear cross closed cross-section 14 extending in the vehicle width direction, and the rear floor 10 and the rear cross member lower panel 13 form therebetween a rear cross closed cross-section 15 extending in the vehicle width direction, so that a so-called double closed cross-section structure is formed in which the upper and lower rear cross closed cross-sections 14, 15 are opposed to each other through the rear floor 10.

As illustrated in FIGS. 2 and 4, a rear end member 16 is joined and fixed to a vehicle rearward side of the rear floor 10 through a joint section 10R.

The rear end member 16 forms a rear end closed cross-section 18 extending in the vehicle width direction, in cooperation with a rear end panel 17. In this embodiment, the rear end member 16 is joined and fixed to a foreside of the rear end panel 17. Alternatively, a forward-rearward positional relationship between the rear end panel 17 and the rear end member 16 may be contrary to the above, i.e., may be a relationship in which the rear end panel 17 and the rear end member 16 are located, respectively, in front of and behind the other.

As illustrated in FIGS. 2 and 3, a pair of rear side frames 19, 19 are joined and fixed, respectively, to vehicle widthwise opposite sides, i.e., right and left sides, of the rear floor 10, through joint sections 10RI, 10LE.

The rear side frame 19 is a vehicle body strength member which extends in the forward-rearward direction of the vehicle, and comprises a cross-sectionally hat-shaped rear side frame upper panel 20, and a cross-sectionally inverted hat-shaped rear side frame lower panel 21. The rear side frame upper panel 20 and the rear side frame lower panel 21 joined and fixed together through respective ones of the joint sections 10RI, 10LE internally have a rear side closed cross-section 22 extending in the forward-rearward direction of the vehicle, and therefore fulfills a role in enhancing rigidity of a lateral portion of the vehicle body.

In short, as illustrated in FIGS. 2 to 4, the rear cross member 11, the rear end member 16 and each of the rear side frames 19, 19 are joined and fixed, respectively, to a vehicle forward side, the vehicle rearward side and a corresponding one of the vehicle widthwise opposite sides, i.e., right and left sides, of the rear floor 10, and arranged to surround an outer peripheral edge of the rear floor 10.

As illustrated in FIGS. 2 to 4, the rear floor 10 comprises, as an article storage portion, a spare tire pan 23 formed to protrude downwardly at a position spaced apart from each of the rear side frames 19, 19 which are at least two frame members arranged on the vehicle widthwise opposite sides of the rear floor 10.

In this embodiment, the spare tire pan 23 is provided in spaced-apart relation to all of a plurality of frame members surrounding the outer peripheral edge of the rear floor 10, i.e., the rear cross member 11, the rear end member 16 and the right and left rear side frames 19, 19, and at a height position lower than the frame members (11, 16, 19, 19).

The spare tire pan 23 has a tire storage bottom 24 as a storage bottom forming a bottom region of the spare tire pan 23, and a tire storage wall 25 as a storage wall forming a peripheral wall region of the spare tire pan 23.

As illustrated in FIGS. 2 to 4, a tire support bracket 26 serving as an article support device is joined and fixed to an upper surface of a central region of the tire storage bottom 24 of the spare tire pan 23.

As illustrated in FIGS. 3 and 4, a spare tire 27 as an article to be stored in the spare tire pan 23 comprises a wheel disc 28, a rim 29, and a tire 30.

As illustrated in FIG. 3, the rear floor 10 further comprises a pair of right and left lateral coupling portions 31, 31 coupling right and left upper ends 25a of the tire storage wall 25 to respective ones of the joint sections 10RI, 10LE. As illustrated in FIG. 4, the rear floor 10 also comprises a front coupling portion 32 coupling the rear cross member 11 which is the frame member on the vehicle forward side of the rear floor 10 to a front upper end 25b of the tire storage wall 25, and a rear coupling portion 33 coupling the rear end member 16 which is the frame member on the vehicle rearward side of the rear floor 10 to a rear upper end 25c of the tire storage wall 25.

As illustrated in FIG. 3, each of the right and left upper ends 25a of the tire storage wall 25 is located below a corresponding one of the joint sections 10RI, 10LE between the rear floor 10 and respective ones of the rear side frames 19 which are the frame members on the vehicle widthwise opposite sides of the rear floor 10. Each of the pair of lateral coupling portions 31, 31 is formed by a downwardly inclined planar surface.

More specifically, as illustrated in FIG. 3, each of the lateral coupling portions 31 extends in a direction defining a downward angle θ with respect to a horizontal line HOR passing through a corresponding one of the joint sections 10RI, 10LE, in sectional view along the vehicle width direction. The angle θ, i.e., an angle defined between a line tangent to a surface of a vehicle widthwise cross-section of the lateral coupling portion 31 and the horizontal line HOR is set in the range of 12 to 25 degrees.

In this specification, the configuration "lateral coupling portion is inclined downwardly" includes both cases where the lateral coupling portion 31 is entirely inclined downwardly and where most of the lateral coupling portion 31 is inclined downwardly. FIG. 3 illustrates an example of the latter case, i.e., an example of the case where most of the lateral coupling portion 31 (a large part of the lateral coupling portion 31, except for a vehicle widthwise outer end thereof) is inclined downwardly, wherein the angle θ means an angle of the inclined portion. The term "most of the lateral coupling portion" here means 70% or more of a length of the lateral coupling portion 31.

In this embodiment, the inclination angle θ of the lateral coupling portion 31 is set in the range of 12 to 25 degrees as mentioned above, so as to ensure rigidity of the spare tire pan 23 and thus rigidity of the rear floor 10, while ensuring an article storage space.

Specifically, if the angle θ is less than 12 degrees, the lateral coupling portion 31 comes excessively close to a horizontal posture, resulting in failing to ensure sufficient rigidity. On the other hand, if the angle θ exceeds 25 degrees, rigidity can be ensured, but it becomes impossible to sufficiently ensure the article storage space of the spare tire pan 23, due to an excessively steep angle of the downward inclination. In view of these circumstances, the angle θ is set in the range of 12 to 25 degrees, so that it becomes possible to satisfy both of the need for ensuring the rigidity and the need for ensuring the article storage space.

The spare tire pan 23 is formed to protrude downwardly at a position spaced apart from not only each of the rear side frames 19 but also the rear cross member 11 which is the frame member on the vehicle forward side of the rear floor 10. As illustrated in FIG. 4 which is a sectional view taken along the forward-rearward direction of the vehicle body, a horizontal distance L1 between the rear end member 16 (in this embodiment, the joint section 10R) and the rear upper end 25c of the tire storage wall 25 is set to be less than a horizontal distance L2 between a rear portion of the rear cross member 11 and the front upper end 25b of the tire storage wall 25.

That is, the position of the spare tire pan 23 is set to satisfy the following relational formula: L2>L1. In other words, the rear floor 10 is formed to allow a horizontal distance L2 of the front coupling portion 32 to become greater than a horizontal distance L1 of the rear coupling portion 33. This makes it possible to adjust an antinode (a point having a large amplitude) of a vibration mode by a resonant frequency to be shifted toward a vehicle forward side, thereby avoiding a situation where an antinode of a vibration mode by a resonant frequency is located on a vehicle rear side portion having higher sensitivity to frequency.

Further, the front coupling portion 32 is formed by a curved surface, more specifically, an upwardly convex curved surface, to impart surface rigidity, thereby preventing a panel resonant frequency from becoming lower.

Figure 5A:
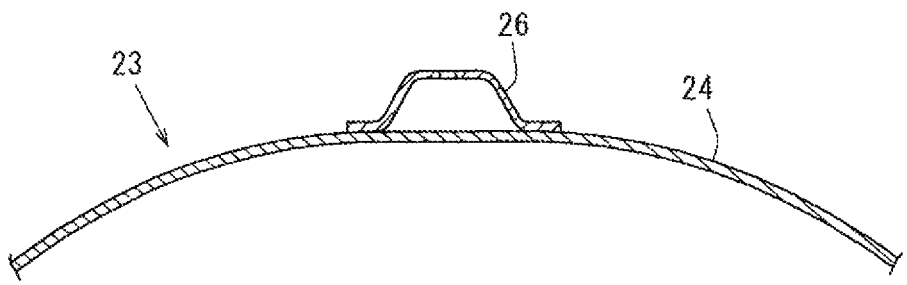
FIG. 5A is a fragmentary sectional view illustrating an example of a tire storage bottom, wherein a central region thereof is formed by an upwardly convex curved surface.
Figure 5B:
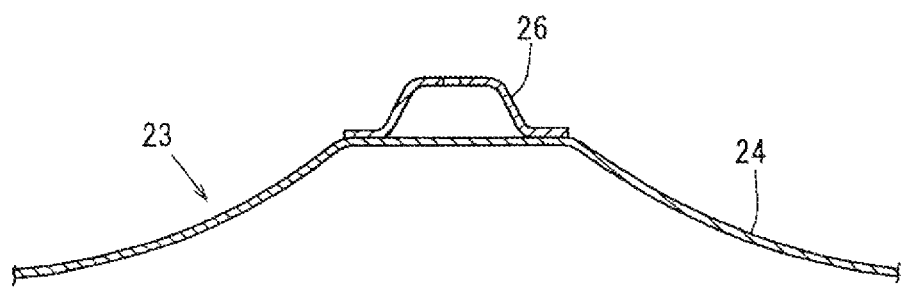
FIG. 5B is a fragmentary sectional view illustrating another example of the tire storage bottom, wherein the central region thereof is formed by a downwardly convex curved surface.

FIGS. 5A and 5B are enlarged views of the tire storage bottom 24 of the spare tire pan 23 (it is to be noted that a curvature of a curved surface is exaggeratingly illustrated for the sake of convenience of illustration). In an example in FIG. 5A, a central region of the tire storage bottom 24 is formed by an upwardly convex curved surface, and, in an example in FIG. 5B, the central region of the tire storage bottom 24 is formed by a downwardly convex curved surface. In either example, it is possible to enhance the surface rigidity, as compared to the case where the tire storage bottom 24 is formed by a planar surface.

Further, the upwardly convex curved surface illustrated in FIG. 5A allows the central region of the tire storage bottom 24 to have more enhanced rigidity and higher resonant frequency, as compared to the downwardly convex curved surface illustrated in FIG. 5B. Thus, the structure in FIG. 5A is more preferable than the structure in FIG. 5B. It is to be understood that each of the above curved surfaces may be formed as a part of a spherical surface.

FIG. 6 is a characteristic graph illustrating a relationship between the angle θ (see FIG. 3) and an actually measured value of a primary resonant frequency of the spare tire pan 23.

In FIG. 6, the horizontal axis represents the angle θ defined between the line tangent to the surface of the vehicle widthwise cross-section of each of the lateral coupling portions 31 and the horizontal line HOR passing through a corresponding one of the joint sections 10RI, 10LE, and the vertical axis represents a value obtained by subtracting a primary resonant frequency when the angle θ is 0 degree, from a primary resonant frequency when the angle θ is a certain degree (increment in frequency).

The points c, d, e in FIG. 6 denote characteristics of comparative examples having conventional structures different from structures according to this embodiment. Specifically, the characteristic d is a characteristic of a conventional sedan type which has a No. 4.5 cross member 34 indicated by the two-dot chain line in FIG. 4, and has a lateral coupling portion extending in a direction corresponding to the angle θ=0 degree (horizontal direction). The characteristic e is a characteristic of a conventional SUV (Sport Utility Vehicle) type which has a No. 4.5 cross member 35 indicated by the two-dot chain line in FIG. 4, and has a lateral coupling portion extending in a direction corresponding to the angle θ=0 degree (horizontal direction). The characteristic c is a characteristic of a conventional structure which is devoid of the No. 4.5 cross member 34 indicated by the two-dot chain line in FIG. 4, and has a lateral coupling portion extending in a direction corresponding to the angle θ=0 degree (horizontal direction).

On the other hand, the lines a, b denote characteristics of the structures according to this embodiment. Specifically, the characteristic a is a characteristic of a sedan type which is devoid of the No. 4.5 cross member 34 indicated by the two-dot chain line in FIG. 4, and the angle θ≠0 degree. The characteristic b is a characteristic of a SUV type which is devoid of the No. 4.5 cross member 35 indicated by the two-dot chain line in FIG. 4, and the angle θ 0 degree.

As is clear from comparison between respective ones of the characteristic c, d, e, the resonant frequency can be increased from the characteristic c of the structure devoid of the No. 4.5 cross members 34, 35 to the characteristics d, e, by providing the No. 4.5 cross member 34 or the No. 4.5 cross member 35 to enhance the rigidity. However, the conventional structures uses the No. 4.5 cross member 34 or the No. 4.5 cross member 35, so that a vehicle body weight is increased accordingly.

In contrast, as is clear from the characteristics a, b in this embodiment, in both of the sedan type and the SUV type, as the angle θ is gradually increased, the rigidity is enhanced correspondingly, and thereby the resonant frequency is gradually increased. When the angle θ is in the range of 12 to 25 degrees, a resonant frequency approximately equal to or greater than the characteristics d, e of the conventional structures each using a respective one of the No. 4.5 cross members 34, 35 can be obtained without the No. 4.5 cross members 34, 35.

In addition, as is clear from the characteristics a, b, the resonant frequency can be easily adjusted just by slightly changing the angle θ. In short, the structure according to this embodiment is capable of achieving an improvement in NVH performance while maintaining a balance between the resonant frequency control and the reduction in vehicle body weight.

Next, with reference to FIGS. 7 and 8, a design method for designing the vehicle body floor panel structure according to the above embodiment will be described.

Figure 7:
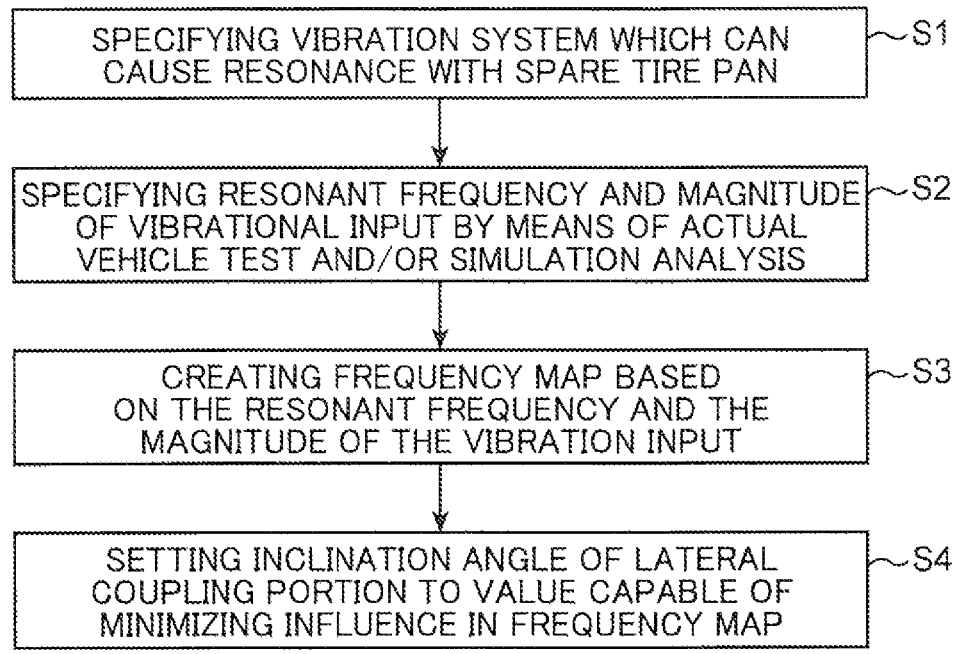
FIG. 7 is a process chart illustrating a vehicle body floor panel structure design method.

FIG. 7 is a process chart illustrating the design method. In Step S1 (vibration system specifying step), a vibration system which can cause resonance with the spare tire pan 23 (rear floor 10) is specified.

Examples of the vibration system which can cause the resonance include: other members forming a hollow space in the passenger compartment, such as a lift gate, a roof panel, a cowl section, a front header, and a front windshield; and vibration input sources causing cavity resonance, power train exciting force, and tire vibration.

Then, in Step S2 (resonant frequency and vibration input specifying step), a resonant frequency and a magnitude of a vibration input is specified by means of actual vehicle test and/or simulation analysis, with respect to each of the vibration systems.

Figure 8:
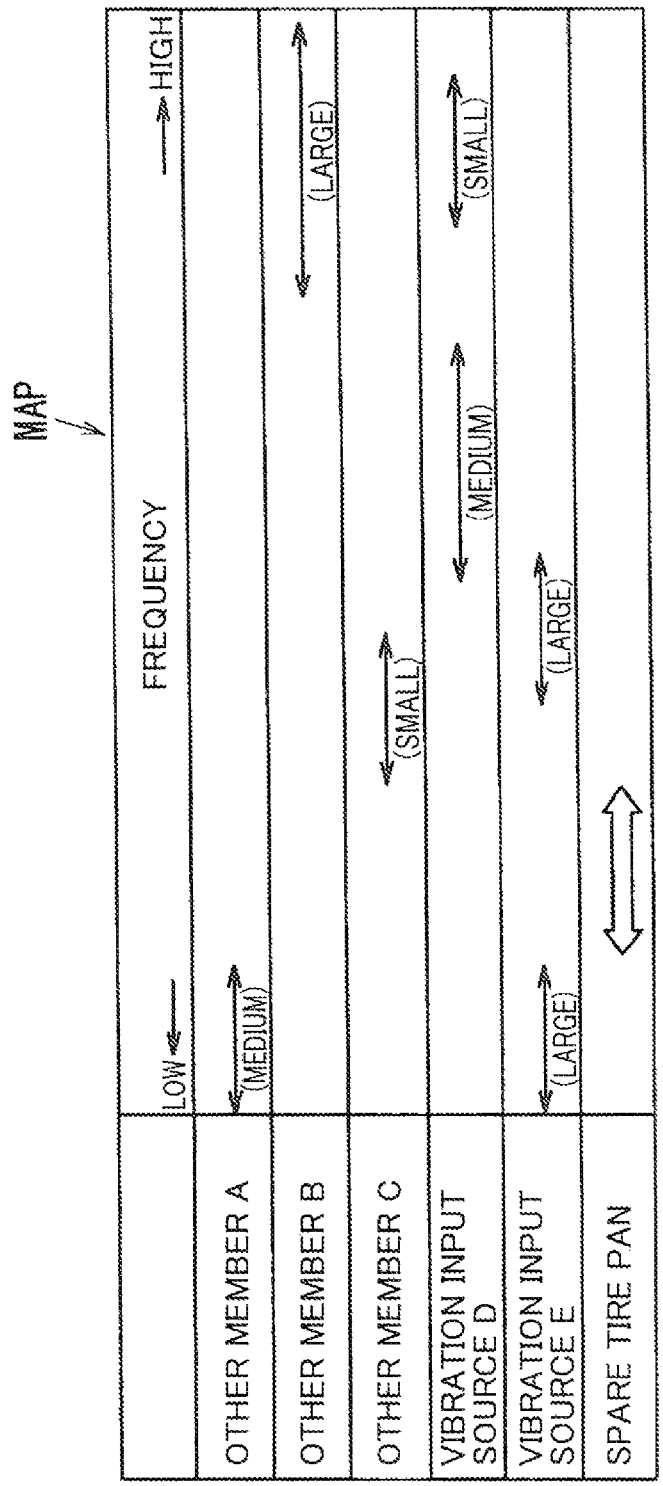
FIG. 8 is an explanatory diagram illustrating one example of a frequency map.

Then, in Step S3 (frequency map creation step), a frequency map (MAP) illustrated in FIG. 8 is created based on the resonant frequency and the magnitude of the vibration input specified in the Step S2.

FIG. 8 illustrates one example of the frequency map (MAP), wherein a band of the resonant frequency (see arrowed line) is indicated with respect to each of other member A, other member B, other member C, vibration input source D and vibration input source E, and the magnitude of the vibrational input is noted in brackets by "large", "medium" and "small".

Then, in Step S4 (angle setting step), the angle θ defined between the line tangent to the surface of the vehicle widthwise cross-section of each of the lateral coupling portions 31 and the horizontal line HOR passing through a corresponding one of the joint sections 10RI, 10LE (inclination angle of each of the lateral coupling portions 31) is set to a value capable of allowing a primary resonant frequency of the spare tire pan 23 to become less subject to influence of the vibration systems (see the other members A, B, C, and the vibration input sources D, E).

That is, a value of the angle θ is determined in such a manner that a resulting frequency range of the spare tire pan 23 does not overlap the frequency ranges of the above vibration systems as indicated by the outlined arrow in FIG. 8, or becomes less subject to influence of the vibration systems.

As above, the vehicle body floor panel structure according to the above embodiment illustrated in FIGS. 1 to 6 comprises: the rear floor 10 (floor panel); and the rear cross member 11, the rear end member 16 and the rear side frames 19, 19 (plurality of frame members) which are arranged on the vehicle forward and rearward sides of and the vehicle widthwise opposite sides of the rear floor 10 to surround the outer peripheral edge of the rear floor 10 and each of which is joined to the rear floor 10 through a respective one of the joint sections 10F, 10R, 10RI, 10LE. The rear floor 10 comprises: the spare tire pan 23 (article storage portion) formed to protrude downwardly at a position spaced apart from each of the rear side frames 19, 19 (frame members on the vehicle widthwise opposite sides of the rear floor 10); and the pair of right and left lateral coupling portions 31, 31 each provided between a respective one of the rear side frames 19, 19 and the spare tire pan 23. The spare tire pan 23 has the tire storage bottom 24 (storage bottom) forming the bottom region of the spare tire pan 23, and the tire storage wall 25 (storage wall) forming the peripheral wall region of the spare tire pan 23. The tire storage bottom 24 has the upwardly or downwardly convex curved surface (see FIGS. 5A and 5B). The tire storage wall 25 is configured such that each of the right and left upper ends 25a thereof is located below a corresponding one of the joint sections 10RI, 10LE between the rear floor 10 and respective ones of the rear side frames 19. Each of the pair of lateral coupling portions 31, 31 is provided to couple each of the right and left upper ends 25a of the tire storage wall 25 and a corresponding one of the joint sections 10RI, 10LE, together. Each of the pair of lateral coupling portions 31 is formed by a downwardly inclined planar surface (see FIGS. 2 and 3).

According to the above features, each of the right and left upper ends 25a of the tire storage wall 25 is located below a corresponding one of the joint sections 10RI, 10LE between the rear floor 10 and respective ones of the rear side frames 19, and each of the pair of lateral coupling portions 31 is formed by a downwardly inclined planar surface, so that it becomes possible to enhance rigidity of the spare tire pan 23 without additionally providing an extra member such as a cross member.

This makes it possible to maintain a balance between the resonant frequency control of the spare tire pan 23 and a reduction in vehicle body weight, thereby providing a vehicle body floor panel structure having excellent NVH performance.

In addition, in the above embodiment, the angle θ defined between the line tangent to the surface of the vehicle widthwise cross-section of each of the lateral coupling portions 31 and the horizontal line HOR passing through a corresponding one of the joint sections 10RI, 10LE is set in the range of 12 to 25 degrees (see FIG. 3).

This feature has the following advantageous effect.

Specifically, if the angle θ is less than 12 degrees, it becomes impossible to ensure sufficient rigidity. On the other hand, if the angle θ exceeds 25 degrees, a shape of a storage space of the spare tire pan 23 becomes inadequate, or a layout of other vehicle body member or vehicle component to be provided around the spare tire pan 23 is likely to be hindered. In contrast, when the angle θ is set in the range of 12 to 25 degrees, as in the above embodiment, it becomes possible to ensure the rigidity while ensuring the article storage space.

Further, it is only necessary to incline the lateral coupling portion 31 in a relatively small angle range of 12 to 25 degrees, so that it becomes possible to enhance the rigidity and the NVH performance while reducing an influence on other performance and layout to a minimal level.

In the above embodiment, the spare tire pan 23 is also formed to protrude downwardly at a position spaced apart from the rear cross member 11 (frame member on the vehicle forward side of the rear floor 10), and the horizontal distance L1 between the rear end member 16 (the frame member on the vehicle rearward side of the rear floor 10) and the rear upper end 25c of the tire storage wall 25 is set to be less than the horizontal distance L2 between the rear cross member 11 and the front upper end 25b of the tire storage wall 25 (see FIG. 4).

According to this feature, it becomes possible to adjust an antinode (a point having a large amplitude) of a vibration mode by a resonant frequency to be shifted toward a vehicle forward side. Specifically, a vehicle rear side portion has higher sensitivity to frequency. Thus, the NVH performance can be more effectively enhanced by shifting the antinode of the vibration mode toward a vehicle forward side so as to get away from the vehicle rear side portion.

In the above embodiment, the front coupling portion 32 coupling between the rear cross member 11 and the front upper end 25b of the tire storage wall 25 has a curved surface (see FIG. 4).

According to this feature, the front coupling portion 32 is formed by a curved surface to impart surface rigidity, so that it becomes possible to prevent a panel resonant frequency from becoming lower. On the other hand, if the front coupling portion 32 is formed by a planar surface, the resonant frequency is lowered.

The vehicle body floor panel structure design method illustrated in FIGS. 7 and 8 comprises: a first step of specifying a vibration system which can cause resonance with the rear floor 10 (floor panel) of the vehicle body (see the Step S1); a second step of specifying a resonant frequency and a magnitude of a vibration input of the vibration system by means of simulation analysis (see the Step S2); and a third step of setting the angle θ defined between the line tangent to the surface of the vehicle widthwise cross-section of the lateral coupling portion 31 and the horizontal line HOR passing through a corresponding one of the joint sections (see FIG. 3), to a value capable of providing a resonant frequency which is less subject to influence of the vibration system (see the Step S4).

That is, in the design according to the above embodiment, in the first step (Step S1), a vibration system which can cause resonance with the rear floor 10 of the vehicle body (see the other members A, B, C and the vibration input sources D, E) is specified. Then, in the second step (Step S2), a resonant frequency and a magnitude of a vibration input of the vibration system are specified by means of simulation analysis, and then, in the third step (Step S4), the angle θ defined between the line tangent to the surface of the vehicle widthwise cross-section of the lateral coupling portion 31 and the horizontal line HOR is set to a value capable of providing a resonant frequency which is less subject to influence of the vibration system.

According to this feature, it becomes possible to control the resonant frequency simply and in a versatile manner without a need for a change of a vehicle body structure.

Figure 9:
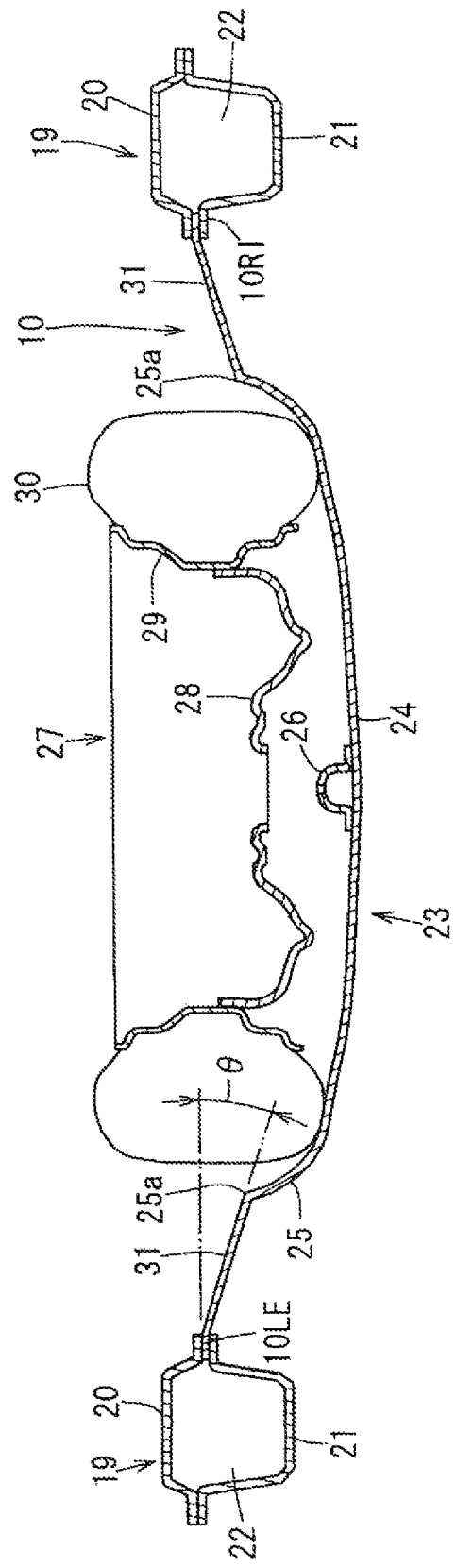
FIG. 9 is a sectional view illustrating a tire storage bottom in another embodiment of the present invention, taken along a vehicle width direction.
Figure 10:
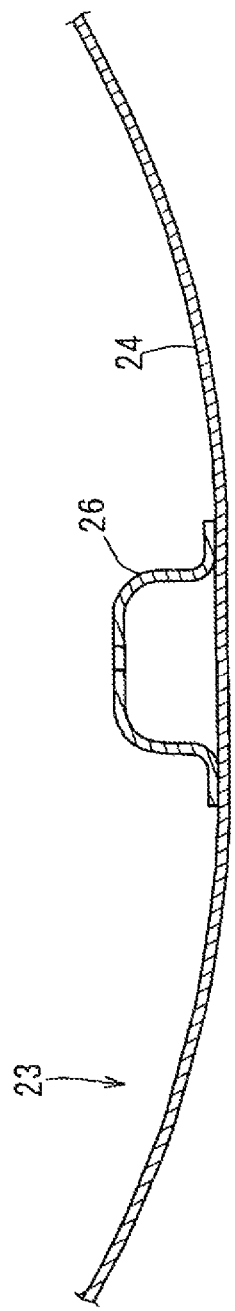
FIG. 10 is a fragmentary enlarged sectional view of the tire storage bottom in FIG. 9.

FIGS. 9 and 10 illustrate a vehicle body floor panel structure according to another embodiment of the present invention, wherein FIG. 9 is a sectional view illustrating a spare tire pan 23, taken along a vehicle width direction, and FIG. 10 is a fragmentary enlarged sectional view of the spare tire pan in FIG. 9 (it is to be noted that a curvature of a curved surface in FIG. 10 is exaggeratingly illustrated for the sake of convenience of illustration).

As illustrated in FIGS. 9 and 10, in this embodiment, a tire storage bottom 24 is entirely formed by a downwardly convex, smooth curved or spherical surface.

This embodiment is the same as the aforementioned embodiment, in terms of the remaining structure, and functions/effects. Thus, in FIGS. 9 and 10, the same element or component as that in the aforementioned figures is assigned with the same code, and its detailed description will be omitted.

Although the present invention has been described based on the preferred embodiments thereof, it is to be understood that the present invention is not limited to these embodiments.

For example, in the above embodiments, each of the pair of lateral coupling portions 31 is formed by a downwardly inclined planar surface, and the tire storage bottom 24 (storage bottom) is formed by an upwardly or downwardly convex curved surface. However, as long as a basis surface thereof is a curved or planar surface, any partial deformed structure, such as a reinforcing protrusion or a hole, may be added to the basis surface. The same applies to the front coupling portion 32 and the rear coupling portion 33.

In the above embodiments, each of the pair of lateral coupling portions 31 is formed by a downwardly inclined planar surface. However, the lateral coupling portion 31 is not limited to the inclined planar surface, but may be an inclined curved surface or may be a structure obtained by combining an inclined planar or curved surface with a reinforcing protrusion or the like.

In the above embodiments, each of the pair of lateral coupling portions 31, 31 is formed by a downwardly inclined planar or curved surface (see FIG. 3). Alternatively, only one of the pair of lateral coupling portions 31, 31 may be inclined downwardly. However, when each of the pair of lateral coupling portions 31, 31 is inclined downwardly, as in the above embodiments, the rigidity of the spare tire pan 23 can be further enhanced, and the resonant frequency control is further facilitated.

In the above embodiments, the spare tire pan 23 for storing the spare tire 27 is equivalent to an article storage portion set forth in the appended claims. However, as long as the article storage portion is formed in the rear floor 10 to allow some kind of article to be stored therein, it is not limited to the spare tire pan 23.

Last of all, distinctive features disclosed by the above embodiments and their modifications, and functions/advantageous effects based on the features, will be outlined.

The technique disclosed here relates to a vehicle body floor panel structure which comprises a floor panel, and a plurality of frame members arranged on vehicle forward and rearward sides of and vehicle widthwise opposite sides of the floor panel to surround an outer peripheral edge of the floor panel and each joined to the floor panel through a respective one of a plurality of joint sections. The floor panel comprises: an article storage portion formed to protrude downwardly at a position spaced apart from each of at least two of the plurality of frame members on the vehicle widthwise opposite sides of the floor panel; and a pair of right and left lateral coupling portions each provided between a respective one of the two frame members on the vehicle widthwise opposite sides of the floor panel and the article storage portion. The article storage portion has a storage bottom forming a bottom region of the article storage portion, and a storage wall forming a peripheral wall region of the article storage portion. The storage bottom has an upwardly or downwardly convex curved surface. The storage wall is configured such that each of right and left upper ends thereof is located below a corresponding one of the joint sections between the floor panel and respective ones of the two frame members on the vehicle widthwise opposite sides of the floor panel. Each of the pair of lateral coupling portions is provided to couple each of the right and left upper ends of the storage wall and a corresponding one of the joint sections together. At least one of the pair of lateral coupling portions is formed by a downwardly inclined planar or curved surface.

Among the plurality of frame members, the frame member on the vehicle forward side of the floor panel, and the frame member on the vehicle rearward side of the floor panel may be, respectively, a rear cross member and a rear end member, and each of the frame members of the vehicle widthwise opposite sides of the floor panel may be a rear side frame. Further, the floor panel may be a rear floor.

According to the above features, each of the right and left upper ends of the storage wall is located below a corresponding one of the joint sections between the floor panel and respective ones of the frame members on the vehicle widthwise opposite sides of the floor panel, and at least one of the lateral coupling portions is formed by a downwardly inclined planar or curved surface, so that it becomes possible to enhance rigidity of the article storage portion without additionally providing an extra member such as a cross member.

This makes it possible to maintain a balance between the resonant frequency control of the article storage portion and a reduction in vehicle body weight, thereby providing a vehicle body floor panel structure having excellent NVH performance.

Preferably, in the above floor panel structure, each of the pair of lateral coupling portions is formed by a downwardly inclined planar or curved surface.

According to this feature, each of the lateral coupling portions is inclined downwardly, so that the rigidity of the article storage portion can be further enhanced, and the resonant frequency control is further facilitated.

Preferably, in the above floor panel structure, an angle defined between a line tangent to a surface of a vehicle widthwise cross-section of each of the lateral coupling portions and a horizontal line passing through a corresponding one of the joint sections is set in the range of 12 to 25 degrees.

This feature has the following advantageous effect.

Specifically, if the angle is less than 12 degrees, it becomes impossible to ensure sufficient rigidity. On the other hand, if the angle exceeds 25 degrees, a shape of a storage space of the article storage portion becomes inadequate, or a layout of other vehicle body member or vehicle component is likely to be hindered. In contrast, when the angle is set in the range of 12 to 25 degrees, as mentioned above, it becomes possible to ensure the rigidity while ensuring the article storage space.

Further, it is only necessary to incline the lateral coupling portion 31 in a relatively small angle range of 12 to 25 degrees, so that it becomes possible to enhance the rigidity and the NVH performance while reducing an influence on other performance and layout to a minimal level.

Preferably, in the above floor panel structure, the article storage portion is formed to protrude downwardly at a position spaced apart from the frame member on the vehicle forward side of the floor panel, wherein a horizontal distance between the frame member on the vehicle rearward side of the floor panel and a rear upper end of the storage wall is set to be less than a horizontal distance between the frame member on the vehicle forward side of the floor panel and a front upper end of the storage wall.

According to this feature, it becomes possible to adjust an antinode (a point having a large amplitude) of a vibration mode by a resonant frequency to be shifted toward a vehicle forward side. Specifically, a vehicle rear side portion has higher sensitivity to frequency. Thus, the NVH performance can be more effectively enhanced by shifting the antinode of the vibration mode toward a vehicle forward side so as to get away from the vehicle rear side portion.

More preferably, the frame member on the vehicle forward side of the floor panel and the front upper end of the storage wall are coupled therebetween through a front coupling portion which has a curved surface.

According to this feature, the front coupling portion is formed by a curved surface to impart surface rigidity, so that it becomes possible to prevent a panel resonant frequency from becoming lower. On the other hand, if the front coupling portion is formed by a planar surface, the resonant frequency is lowered.

Preferably, in the above floor panel structure, the article storage portion is a spare tire pan.

According to this feature, it becomes possible to achieve an improvement in NVH performance while maintaining a balance between the resonant frequency control of the spare tire pan and a reduction in vehicle body weight.

The technique disclosed here also related to a method for designing the above vehicle body floor panel structure. This design method comprises: a first step of specifying a vibration system which can cause resonance with the floor panel of the vehicle body; a second step of specifying a resonant frequency and a magnitude of a vibration input of the vibration system by means of simulation analysis; and a third step of setting an angle defined between a line tangent to a surface of a vehicle widthwise cross-section of each of the lateral coupling portions and a horizontal line passing through a corresponding one of the joint sections, to a value capable of providing a resonant frequency which is less subject to influence of the vibration system.

Examples of the vibration system which can cause the resonance with the floor panel of the vehicle body may include: other members forming a hollow space in the passenger compartment, such as a lift gate, a roof panel, a cowl section, a front header, and a front windshield; and vibration input sources causing cavity resonance, power train exciting force, and tire vibration.

According to this feature, it becomes possible to control the resonant frequency simply and in a versatile manner without a need for a change of a vehicle body structure.

What is claimed is:

1. A vehicle body floor panel structure comprising a floor panel, and a plurality of frame members arranged on vehicle forward and rearward sides of and vehicle widthwise opposite sides of the floor panel to surround an outer peripheral edge of the floor panel and each joined to the floor panel through a respective one of a plurality of joint sections,
wherein the floor panel comprises: an article storage portion formed to protrude downwardly at a position spaced apart from each of at least two of the plurality of frame members on the vehicle widthwise opposite sides of the floor panel; and a pair of right and left lateral coupling portions each provided adjacent to a respective one of the two frame members on the vehicle widthwise opposite sides of the floor panel and the article storage portion,
and wherein the article storage portion has a storage bottom forming a bottom region of the article storage portion, and a storage wall forming a peripheral wall region of the article storage portion,
and wherein:
the storage bottom has an upwardly or downwardly convex curved surface;
the storage wall is configured such that each of right and left upper ends thereof is located below a corresponding one of the joint sections between the floor panel and respective ones of the two frame members on the vehicle widthwise opposite sides of the floor panel;
each of the pair of lateral coupling portions is provided to couple each of the right and left upper ends of the storage wall and a corresponding one of the joint sections together; and
each of the pair of lateral coupling portions has a region formed as a planar or curved surface which extends inwardly in a vehicle width direction while being inclined downwardly, and connects to a respective one of the right and left upper ends of the storage wall, the curved surface region being formed such that an angle defined between a line tangent to a surface of one of the pair of lateral coupling portions and a horizontal line passing through a corresponding one of the joint sections is in the range of 12 to 25 degrees in a widthwise direction, or the inclined planar surface region being formed such that an angle defined between a line parallel to a surface of one of the pair of lateral coupling portions and a horizontal line passing through a corresponding one of the joint sections is in the range of 12 to 25 degrees in the widthwise direction, and a length of the inclined planar or curved surface region accounts for 70% or more of that of each of the pair of lateral coupling portions.

2. The vehicle body floor panel structure as defined in claim 1, wherein the storage bottom has an upwardly convex curved surface.

3. A vehicle body floor panel structure design method for designing the vehicle body floor panel structure as defined in claim 1, comprising:
a first step of specifying a vibration system which can cause resonance with the floor panel of the vehicle body as defined in claim 1;
a second step of specifying a resonant frequency and a magnitude of a vibration input of the vibration system by means of simulation analysis; and
a third step of setting an angle defined between a line tangent to a surface of a vehicle widthwise cross-section of each of the lateral coupling portions and a horizontal line passing through a corresponding one of the joint sections, to a value capable of providing a resonant frequency which is less subject to influence of the vibration system.

4. The vehicle body floor panel structure as defined in claim 1, wherein the curved surface region or the inclined planar surface region is provided between a horizontally extending portion of the floor panel and the storage wall of the peripheral wall region of the article storage portion,
wherein the horizontally extending portion is in contact with one of the frame members, and
wherein the angle in the range of 12 to 25 degrees is less than a larger angle between the horizontal line passing through the corresponding one of the joint sections and a line tangent to a surface of the storage wall of the peripheral wall region of the article storage portion.

5. The vehicle body floor panel structure as defined in claim 4, wherein the article storage portion is a spare tire pan, and, with a spare tire provided in the spare tire pan, the horizontal line passing through the corresponding one of the joint sections also passes through the spare tire.

6. The vehicle body floor panel structure as defined in claim 1, wherein the article storage portion is formed to protrude downwardly at a position spaced apart from the frame member on the vehicle forward side of the floor panel,
and wherein a horizontal distance between the frame member on the vehicle rearward side of the floor panel and a rear upper end of the storage wall is set to be less than a horizontal distance between the frame member on the vehicle forward side of the floor panel and a front upper end of the storage wall.

7. The vehicle body floor panel structure as defined in claim 6, wherein the frame member on the vehicle forward side of the floor panel and the front upper end of the storage wall are coupled therebetween through a front coupling portion which has a curved surface.

8. The vehicle body floor panel structure as defined in claim 1, wherein the article storage portion is a spare tire pan.

9. The vehicle body floor panel structure as defined in claim 8, wherein a primary resonant frequency of the spare tire pan is greater than 4 Hz and less than 12 Hz.

10. The vehicle body floor panel structure as defined in claim 9, wherein a sedan type vehicle is provided with the vehicle body floor panel structure and the primary resonant frequency of the spare tire pan is greater than 4 Hz and less than 10 Hz.

11. The vehicle body floor panel structure as defined in claim 9, wherein a sport utility vehicle is provided with the vehicle body floor panel structure and the primary resonant frequency of the spare tire pan is greater than 7 Hz and less than 12 Hz.

* * * * *